Patented July 26, 1932

1,868,879

UNITED STATES PATENT OFFICE

CHARLES FREDERICK BROADHEAD, OF TOORAK, AND ROLAND STUART ANDREWS, OF CAULFIELD, VICTORIA, AUSTRALIA, ASSIGNORS OF ONE-HALF TO B. H. P. BY-PRODUCTS PROPRIETARY LIMITED, OF MELBOURNE, VICTORIA, AUSTRALIA, A COMPANY OF VICTORIA

TREATMENT OF TARS

No Drawing. Application filed October 31, 1929, Serial No. 403,906, and in Australia November 29, 1928.

This invention relates to improvements in the treatment of tars, which are distillation products from the destructive distillation of natural organic substances such as coal, wood and the like, and refers more especially to the treatment of tars produced in the manufacture of illuminating gas or in by-product ovens or by methods of low temperature carbonization of coal.

Though tars have been extensively used in roadway construction and for roofing and other industrial purposes in many cases, owing partly to disabilities inherent in more recent methods of their production, their relative value as compared with asphalt for such purposes has been lessened. This is especially true with tars produced by continuous processes of carbonization of coal.

The object of the present invention is to render tars more stable and better suited for use in roadway construction, and in connection with the manufacture of roofing and insulating materials, paints and the like.

We accomplish the above mentioned object by subjecting tars to treatment with an aldehyde of the condensation type followed by treatment with a suitable oxidizing reagent.

In practice this treatment preferably comprises digesting the tars with a suitable aldehyde and a condensation catalyst with heat, and then passing air or other oxidizing gas through or over the same, preferably in the presence of a polymerizing accelerant.

In carrying the invention into practical effect, tars such as those produced by the destructive distillation of coal are digested in a suitable vessel together with the requisite quantity of one of the aldehydes, preferably formaldehyde, and a suitable condensation catalyst, such as ammonia or sulphate of ammonia. This digesting operation results in the conversion of the tar acids into resinous bodies.

In lieu of employing formaldehyde in the above mentioned operation, any other aldehyde of the condensation type, such for example, as acetaldehyde, of furfuraldehyde, may be used.

Likewise, any satisfactory condensation catalyst, such as for example, sulphuric acid or hydrochloric acid, may be utilized in lieu of ammonia.

After the digesting operation has been completed the resultant product is subjected to oxidizing treatment preferably with heat. For this purpose air preferably heated is pumped or otherwise passed through or over the material for the requisite period. In this operation we prefer to employ a suitable polymerizing accelerant, such as sulphate of iron or sulphate of copper for the purpose of hastening the polymerization of the unsaturated hydrocarbons but the addition of such accelerant is not essential as the digested tar contains oxygenated compounds which will assist in bringing about this change.

The last mentioned operation causes the unsaturated hydrocarbons to be polymerized into resinous or gummy bodies and it will be understood that, as its duration determines the viscosity of the product, the latter may, within certain limits, be prepared of different degrees, suitable for various uses.

In lieu of employing heated air for converting the unsaturated hydrocarbons into resinous bodies ozone, oxygen or ozonized air may, if desired, be employed for this purpose.

The quantities and proportions of the reagents used and the temperatures and periods of duration of the operations are dependent upon various factors, such as the constitution of the crude tar treated and the nature of the product required.

When it is desired to recover the lighter oils given off during the polymerizing operation, the same is preferably carried out in a vessel provided with a condenser for recovering the said oils.

The following is an example of an application of this invention to the treatment of certain tars obtained from the continuous carbonization of coal in vertical retorts in the manufacture of luminating gas.

*Example.*—12,000 lbs. of tar were placed in a closed vessel with 150 lbs. of formaldehyde of 40% strength and a condensation catalyst consisting of 44 lbs. of an aqueous solution of ammonia of .880 sp. g. This vessel was heated by approved means and maintained at a temperature not exceeding 95° C. for a period of about 6 hours. An amount of ferrous sulphate ($FeSO_4.7H_2O$) equivalent to 60 lbs. was then added and air heated to a temperature of from 100° C. to 200° C. was then passed through the vessel for a period of about 25 hours. The maximum temperature of the vapour passing from the vessel during this oxidizing operation was approximately 140° C. and the temperature of the body of material about 180° C.

By the treatment as above described the aforementioned tars which were quite unsuitable for use in road construction or for the other industrial purposes mentioned were converted into a condition, being at atmospheric temperatures similar to a plastic pitch, and eminently suitable for use as in roadway construction and other industrial purposes.

We claim:

1. In the treatment of tar to convert it into a condition such that at normal temperatures it will be similar to a plastic pitch, the steps of digesting the tar with an aldehyde of the condensation type in the presence of a condensation catalyst and then subjecting the resulting product to oxidizing treatment.

2. A process for converting tar acids in tar to resinous bodies which comprises digesting the tar with an aldehyde.

3. In the treatment of tar to convert it into a condition such that at normal temperatures it will be similar to a plastic pitch, the steps of subjecting the tar to treatment with an aldehyde of the condensation type and a condensation catalyst while heating the mixture in a closed vessel and then subjecting the same to oxidizing treatment.

4. In the treatment of tar to convert it into a condition such that at normal temperatures it will be similar to a plastic pitch, the steps of heating the tar with an aldehyde of the condensation type and a condensation catalyst in a closed vessel and then subjecting the product to oxidizing treatment.

5. In the treatment of tar to convert it into a condition such that at normal temperatures it will be similar to a plastic pitch, the steps of heating the tar with an aldehyde of the condensation type and a condensation catalyst in a closed vessel and then bringing an oxidizing gas into contact with the product.

6. A process for the treatment of tars which comprises adding an aldehyde and a catalyst to the tars and digesting the same at an elevated temperature not exceeding 100° C. in a closed vessel for the required period, adding a catalyst to the digested tars, raising the temperature of the digested tar to between 100 and 200° C., and passing an oxidizing gas in contact with the digested material for the required period.

7. In the treatment of tars according to the next preceding claim, wherein the temperature of the digested material during the oxidizing operation is raised progressively to between 100 and 200° C. and the oxidizing gas is passed in contact therewith for a period of from 10 to 30 hours.

8. In the treatment of tar to convert it into a condition such that at normal temperatures it is similar to a plastic pitch, the steps of adding an aldehyde of the condensation type and a condensation catalyst to the tar and digesting the same and then bringing an oxidizing gas into contact with the resulting product until it has acquired the required viscosity.

9. In the treatment of tar to convert it into a condition such that at normal temperatures it is similar to a plastic pitch, the steps of digesting the tar with formaldehyde and ammonia while heating the tar and then bringing an oxidizing gas into contact with the product.

10. In the treatment of tar to convert it into a condition such that at normal temperatures it is similar to a plastic pitch, the steps of digesting the tar while heating in a closed vessel with formaldehyde and sulfate of ammonia and then bringing an oxidizing gas into contact with the resulting product.

11. In the treatment of tar to convert it into a condition such that at normal temperatures it is similar to a plastic pitch, which comprises adding an aldehyde of the condensation type and a condensation catalyst to the tar and digesting the mixture at a temperature not exceeding 100° C. until there has been condensation of aldehyde with tar acids in the tar, adding a polymerizing accelerant to the product, raising the temperature of the product to between 100 and 200° C., and bringing an oxidizing gas into contact with the heated product so as to increase its viscosity.

12. In the treatment of tar according to claim 1, progressively raising the temperature of the product from the digesting operation during the oxidizing treatment to between 100 and 200° C., and during the oxidizing treatment maintaining an oxidizing gas in contact with the product for a period of from ten to thirty hours.

In witness whereof we hereunto affix our signatures.

CHARLES FREDERICK BROADHEAD.
ROLAND STUART ANDREWS.